US008914898B2

(12) United States Patent
Tharakan

(10) Patent No.: US 8,914,898 B2
(45) Date of Patent: Dec. 16, 2014

(54) ELECTRONICALLY IMPLEMENTED METHOD AND SYSTEM FOR AUTHENTICATION AND SHARING OF DOCUMENTS VIA A COMMUNICATION NETWORK

(75) Inventor: P. A. Lalan Tharakan, Alleppey (IN)

(73) Assignee: Tharakan Web Innovations Pvt. Ltd., Chennai (IN)

( * ) Notice: Subject to any disclaimer, the term of this patent is extended or adjusted under 35 U.S.C. 154(b) by 378 days.

(21) Appl. No.: 12/865,990

(22) PCT Filed: Mar. 19, 2008

(86) PCT No.: PCT/IN2008/000168
§ 371 (c)(1),
(2), (4) Date: Aug. 3, 2010

(87) PCT Pub. No.: WO2009/098706
PCT Pub. Date: Aug. 13, 2009

(65) Prior Publication Data
US 2011/0010757 A1    Jan. 13, 2011

(30) Foreign Application Priority Data
Feb. 4, 2008    (IN) .............................. 301/CHE/2008

(51) Int. Cl.
*G06F 7/04* (2006.01)
*G06F 17/30* (2006.01)
*H04N 7/16* (2011.01)
*G06F 21/64* (2013.01)
*G06Q 50/18* (2012.01)

(52) U.S. Cl.
CPC .......... *G06F 17/30011* (2013.01); *G06F 21/64* (2013.01); *G06Q 50/18* (2013.01)
USPC .......................................................... 726/27

(58) Field of Classification Search
USPC .......................................................... 726/27
See application file for complete search history.

(56) References Cited

U.S. PATENT DOCUMENTS 6,243,480 B1 *  6/2001  Zhao et al. .................... 382/100
6,393,420 B1    5/2002  Peters
(Continued)

FOREIGN PATENT DOCUMENTS

WO             00/08541           2/2000

OTHER PUBLICATIONS

Seth Bates and Tony Smith, SharePoint 2003 User's Guide, Apress, 2005.*

(Continued)

*Primary Examiner* — Brian P Whipple
(74) *Attorney, Agent, or Firm* — Hamre, Schumann, Mueller & Larson, P.C.

(57) ABSTRACT

The invention provides a method and system of authentication and online sharing of documents by electronic means, through a third party, conducted via a communication network. The method involves, creation of a website, subject to the control of an administration entity; uploading the scanned version of the original document by the user at the allotted location in the website, using the obtained user name and created password; assigning a uniquely identifiable indicia to the scanned document; sending the scanned document to the authenticating entity; accessesing and verifying the authenticity of scanned document by the authenticating entity, by comparison with the original document available in the database of the authenticating entity. The authentication is performed through an electronically simple mechanism only once, in which, irrespective of the date of issue of the document, the document may be attested and the record may be maintained permanently.

9 Claims, 7 Drawing Sheets

(56) References Cited

U.S. PATENT DOCUMENTS

| | | | |
|---|---|---|---|
| 7,669,245 B2* | 2/2010 | Jung et al. | 726/27 |
| 8,510,858 B2* | 8/2013 | Lee | 726/29 |
| 2004/0123129 A1* | 6/2004 | Ginter et al. | 713/193 |
| 2004/0216031 A1* | 10/2004 | Taylor | 715/500 |
| 2006/0029296 A1* | 2/2006 | King et al. | 382/313 |
| 2006/0072144 A1* | 4/2006 | Dowling et al. | 358/1.15 |
| 2006/0282903 A1* | 12/2006 | Jung et al. | 726/27 |
| 2008/0010685 A1* | 1/2008 | Holtzman et al. | 726/27 |
| 2009/0006842 A1* | 1/2009 | Ross et al. | 713/155 |

OTHER PUBLICATIONS

Progressive.com website, Manage your policy, Mar. 15, 2006.*
International Search Report issued in International Application No. PCT/IN2008/000168, mailed Oct. 13, 2009—2 pages.
International Search Report Revised Version issued in International Application No. PCT/IN2008/000168 mailed Mar. 31, 2010—4 pages.

* cited by examiner

[Prior Art]

305  310  315

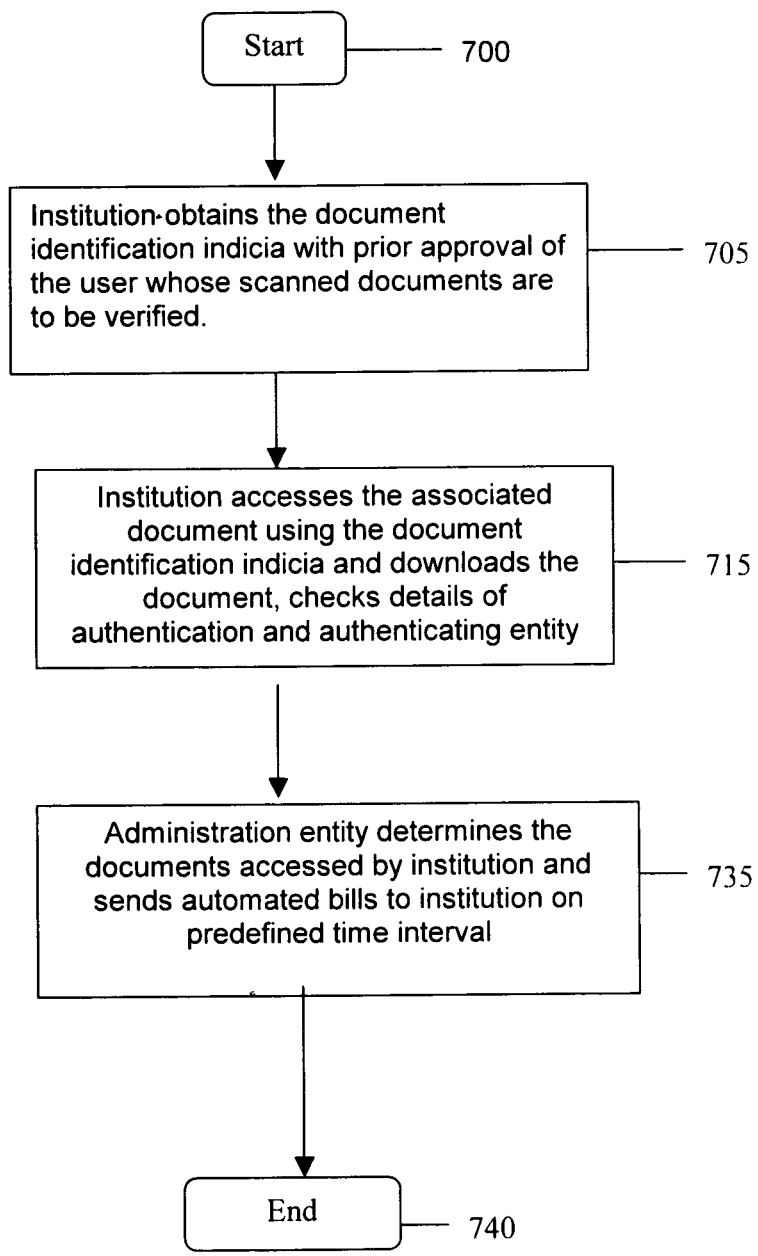

ELECTRONICALLY IMPLEMENTED METHOD AND SYSTEM FOR AUTHENTICATION AND SHARING OF DOCUMENTS VIA A COMMUNICATION NETWORK

FIELD

The invention generally relates to authentication and sharing of documents. More particularly, the invention relates to an electronically implemented method and system for authentication and sharing of documents, through a third party, conducted using a communication network.

BACKGROUND

The advent of communication networks, such as the Internet has substantially increased the availability of information to people, about employment and education prospects overseas or outside their state of residence. As a result, it is a common occurrence in the modern day scenario for people to migrate for the purposes of employment, education and the like.

In such a scenario, the institution in the country or state in which education or employment is sought performs a check to confirm the authenticity of copies of the documents provided for the purpose of entry. In order to perform the check, it is necessary that a third party attest the copies of the related documentation. The third party is conventionally an agency, which has been authorized beforehand, to perform the task of authentication.

Prior to the advent of the communication networks, such as the Internet, the procedure for attesting a document for the purpose of authentication is performed manually. Initially, the user who intends to seek employment or education prospects from an institution obtains photocopies of the original documents, which are required to be authenticated. Further, the documents that are required to be authenticated are submitted to the third party, which has been authorized to perform the task of authentication, beforehand. After the third party performs the attestation of the photocopies of the certificate, the user submits the photocopies of the certificate to the institution, which intends to perform the process of confirming the authenticity of the photocopies of the documents. The institution employs an external agency to determine if the documents are authentic. If the documents are determined to be authentic by the external agency, the organization is intimated by the external agency. If the documents are authentic, the organization approves the user for the education or employment. However, if the documents are not found to be authentic, the organization rejects the user for the education or employment. As a result, this procedure of performing authentication of documents by attesting them manually is cumbersome. Further, the procedure of performing authentication of documents by attesting them manually is time consuming.

A few proposals exist in the art in which, the attesting of the document is performed in an electronic mode.

For instance, a proposal in the art reveals a method for preparing safe electronic notarized documents in electronic commerce. The proposal disclosed therein, describes a method for preparing a safe electronic notarized document in electronic commerce and primarily includes the steps of preparing a primary electronic notarized document, based on transaction detail information, a customer certificate, a merchant certificate, a notarizing organization certificate, and a certifying organization certificate by a notarizing organization.

Subsequently, a digital signature is affixed to the primary notarized document by using a private key of the notarizing organization so as to form a secondary electronic notarized document, and transmitting the secondary electronic notarized document to a customer or a merchant. Further, the secondary electronic notarized document of the first step is decoded by the customer or merchant by using a private key of the notarizing organization.

Furthermore, a digital signature is affixed on the decoded secondary electronic notarized document of the second step by the customer or merchant by using a private key of his or her own so as to form a tertiary electronic notarized document, and transmitting the tertiary electronic notarized document to the notarizing organization. Thereafter, decoding the tertiary electronic notarized document of the third step is performed by using an open key of the notarizing organization and an open key of the customer or merchant so as to form a biquadratic electronic notarized document, and comparing the biquadratic electronic notarized document with the primary electronic notarized document of the first step.

A final electronic notarized document is subsequently created for proving a realization of notarization of the transaction by utilizing the digitally signed tertiary electronic notarized document of the third step and the digitally signed message digest of the fifth step, and sending the final electronic notarized document to the customer or merchant; and storing the final electronic notarized document of the sixth step by the customer or merchant after receipt of it from the notarizing organization.

Yet another proposal in the art reveals an electronic notary. The system has application in the electronic verification process. The operation can be described as comprising the following steps: whenever there is a need for verifying a document, one can transmit the document image through FAX or computer network to an independent third party institute or company. The company can process the document image by locking the document image and extracting the pictorial and texture features, then encrypt these features, time stamp, place, and the items needed to be verified into a machine readable mage code.

Yet another proposal in the art reveals a method in which, after inputting all of the required information, the customer uploads the electronic document to an electronic document repository. An electronic transaction manager determines when all of the required information from each of the parties is present and amalgamates all of the information into a single final electronic document. The parties required to execute the electronic document are notified that the electronic document is ready to be electronically signed and electronically notarized. The signatories go to a notary public or a mobile notary public may travel to a location designated by the requesting signatory. The signatory inputs a manual, hand-written signature to the electronic document, using a electronic signature capture input device. The notary public inputs a manual, hand-written signature to the electronic document, using the electronic signature capture input device.

Yet another proposal in the art, reveals methods and systems to authenticate that an original digital record has not been altered, methods and systems for affixing electronic signatures to such digital records, for verifying integrity and validity of such records and any electronic signature(s) applied thereto, including determining that such records and any associated digital signatures have not been altered, and more specifically, for providing a distributed method and system for such determination and authentication in which the contents of these records need not be disclosed.

The proposals in the art provide a solution to the aforesaid requirement of attesting a document by electronic means. However, the proposals in the art do not reveal a simple mechanism by which, a user can upload the scanned documents of his original certificates at a location such as a website and an attestation and online sharing of the document can be performed by electronic means.

Proposals in the art do not reveal a method and system, in which a user who requires the attestation and online sharing of the document is capable of doing so, by a less cumbersome method.

Proposals in the art do not reveal a method and system, in which a user who requires the attestation and online sharing of document to be performed is capable of doing so, by a less time consuming method.

Proposals in the art do not reveal a method and system, in which a user who requires the attestation and online sharing of document to be performed is capable of doing so by a simple and user-friendly method, even though the mode used is electronic.

SUMMARY

Therefore, it is an object of the present invention is to provide a method and, system by which a user obtains attestation and online sharing of the documents is less cumbersome and cost effective in comparison with the available modes.

Another object of the present invention is to provide a method and system, in which the mechanism by which a user requires to obtain attestation only once and the record is permanent and accessible online.

Yet another object of the present invention is to provide a method and system, which attestation and online sharing of a document is performed through an electronically simple mechanism in which, irrespective of the date of issue of the document, the document may be attested and the record may also be maintained permanently.

Another object of the present invention to provide a method and system in which, the mechanism by which a user obtains attestation and online sharing of the documents is less time consuming in comparison with available modes.

Further object of the present invention to provide a method and system in which, the mechanism by which, obtains attestation and online sharing of the documents is less complicated in comparison with available modes.

It is an objective of the invention to provide a method and system in which, a user obtains attestation and online sharing of the documents by a mechanism, which is more convenient in comparison with the modes known in the art.

Another objective of the invention is to provide a method and system in which, a user obtains attestation and online sharing of the documents by a mechanism, in which user requires to obtain attestation only once and the record is permanent and accessible online.

Yet another objective of the invention is to provide a method and system, in which attestation and online sharing of a document is performed through an electronically simple mechanism in which, irrespective of the date of issue of the document, the document may be attested and the record may also be maintained permanently.

Yet another objective of the invention is to provide a method and system in which, a user obtains attestation and online sharing of the documents by a mechanism, which is less time consuming and cost effective in comparison with the modes known in the art.

Yet another objective of the invention is to provide a method and system in which, the mechanism by which a user obtains attestation and online sharing of the documents is less complicated in comparison with modes of attestation and online sharing known in the art.

Accordingly, the invention provides a method and system of authentication and online sharing of documents by electronic means, through a third party, conducted via a communication network.

The method as embodied in the invention involves, initially, creation of a location such as a website, subject to the control of an administration entity. On creation of the website, a user requiring the attestation of documents to be performed, accesses the website. Thereafter, the user obtains a username and password from the administration entity subject to the validation of the user by the administration entity. The username and password is employable for privately accessing the website and storing documents at the website at a location specifically allotted by the administration entity to the user.

Using the website, the user uploads the scanned version of his original documents at the allotted location by using the obtained user name and created password. On upload of the scanned documents, a document identification indicia by which each document is uniquely identifiable, is allotted to each one of the scanned documents.

Similarly, an entity which is capable of authenticating the scanned documents accesses the website and obtains a username and password after registering in the website subject to the validation of the user by the administration entity. The created username is activated.

Similarly, an institution which is being approached for education or employment accesses the website and obtains a user name and password after registering in the website, subject to the validation of the user by the administration entity. The created user name is activated.

When the user requires documents to be attested, user accesses the website using his user name and password and sends the scanned document to the entity which is capable of authenticating the scanned documents. The received document is positioned in the queue.

The entity, which is capable of authenticating the scanned documents accesses, the scanned documents, checks the authenticity of documents by comparison with the original documents available in the database of the entity, which is capable of authenticating the scanned documents. If the document is authentic, the scanned version of the documents is marked as authentic, after verification with the original document available in the database of the entity, which is capable of authenticating the scanned documents. It is to be noted, that the authentication is performed only once and the record is permanent and accessible online.

When an institution requires to determine the authenticity of the document, the institution obtains the document identification indicia by which each document is uniquely identifiable with the prior approval of the user, whose scanned documents are to be verified. The institution logs in the website and accesses the associated document using the document identification indicia by which each document is uniquely identifiable. As a result, online sharing of the document is enabled.

After identifying the document, the institution downloads the document and checks the attestation details. The administration entity determines the documents accessed by institution. Based on the result of the administration entity, an automated bill is prepared on a predefined time interval and sent to the institution, which requires to determine the authenticity of the document.

It is to be noted that the attestation for a particular document is required to be performed only once, the record being permanent and the subsequent online access being enabled. Also, the attestation and subsequent online sharing is performed through an electronically simple mechanism in which, irrespective of the date of issue of the document, the document may be attested and the record may also be maintained permanently.

Accordingly a method and system for authentication and sharing of documents using a communication network comprising the steps of: creating an account for uploading scanned version of original documents at an allotted location in a website accessible using a communication network with the consent of administrative entity, wherein the said account is electronically communicated to the user after creation; allotting a document identification indicia for the each document uploaded wherein the said document identification indicia for said each document is unique; communicating electronically the said uploaded and scanned version of original documents to the authenticating entity, which is capable of authentication of the scanned document; verifying the said scanned version of original documents with the original copy in the database or with the hard copy; authenticating and electronically attesting the said verified documents as authenticated and attested, wherein the said authenticated document is referred for all purposes quoting the said unique document identification indicia; sharing the authenticated and electronically attested document with third parties using a communication network A method and system for authentication and sharing of documents using a communication network, wherein the authentication and electronic attestation comprises the steps of: creating an account in the website having a database with the consent of the administration entity; uploading the scanned version of original documents which is to be authenticated and attested into an allotted location in a website wherein the said loaded document is accessible through the communication network; allotting a document identification indicia by which each document is uniquely identifiable to each one of the scanned documents; communicating electronically the said uploaded and scanned version of original documents to the authenticating entity to accomplish authentication of the scanned document; verifying the said scanned version of original documents with the original copy in the database or with the hard copy; authenticating and electronically attesting the said verified documents as authenticated and attested, wherein the said authenticated document is referred for all purposes quoting the said unique document identification indicia.

A method and system for authentication and sharing of documents using a communication network, wherein the method for sharing of authenticated and electronically attested document comprises the steps of: assigning the document identification indicia for the document uploaded; citing the said each document identification indicia to third parties while applying for a admission, job, loan and so on along with the application wherein the complete details such as website address, mobile network details of the said document identification indicia is provided therein for easy access; sending the details to the third party where the user seeks admission from University or a loan from a bank etc.; verifying the each document identification indicia using the details provided along with the application for assessing the authenticated and electronically attested document through the communication network.

In an embodiment, method and system for authentication and sharing of documents uses a communication network, wherein the communications network is Internet.

In another embodiment, method and system for authentication and sharing of documents uses a communication network, wherein the communications network is a mobile communication network.

The document identification indicia is alphabetic, numeric or alpha-numeric in nature. The authentication is required only once and the authentication is performed irrespective of the date of issue of the document. The document identification indicia is a unique number for the authenticated and electronically attested document which can be quoted for all purposes for verification of any document. The administrative entity is a service provider for authentication and electronic attestation, and having database for sharing the authenticated document using communication network. The document is a certificate, license, registered document, copy of policy, share document, letter patent and the like. The authenticating and attesting entity is a party issuing the original document, such as a University, Board of Schools, License issuing authority, Registration department, Insurance department, patent office, or company.

A method and system for authentication and sharing of documents using a communication network, wherein the system comprises: a client-side computer employed by the user to input the scanned version of his original documents; website subject to the control of an administration entity in which the scanned version of the original documents are displayed; an authenticating entity, which is capable of authenticating; the scanned documents; a third party with whom the authenticated and electronically attested documents are shared using a communication network.

DRAWINGS

Figure 6:
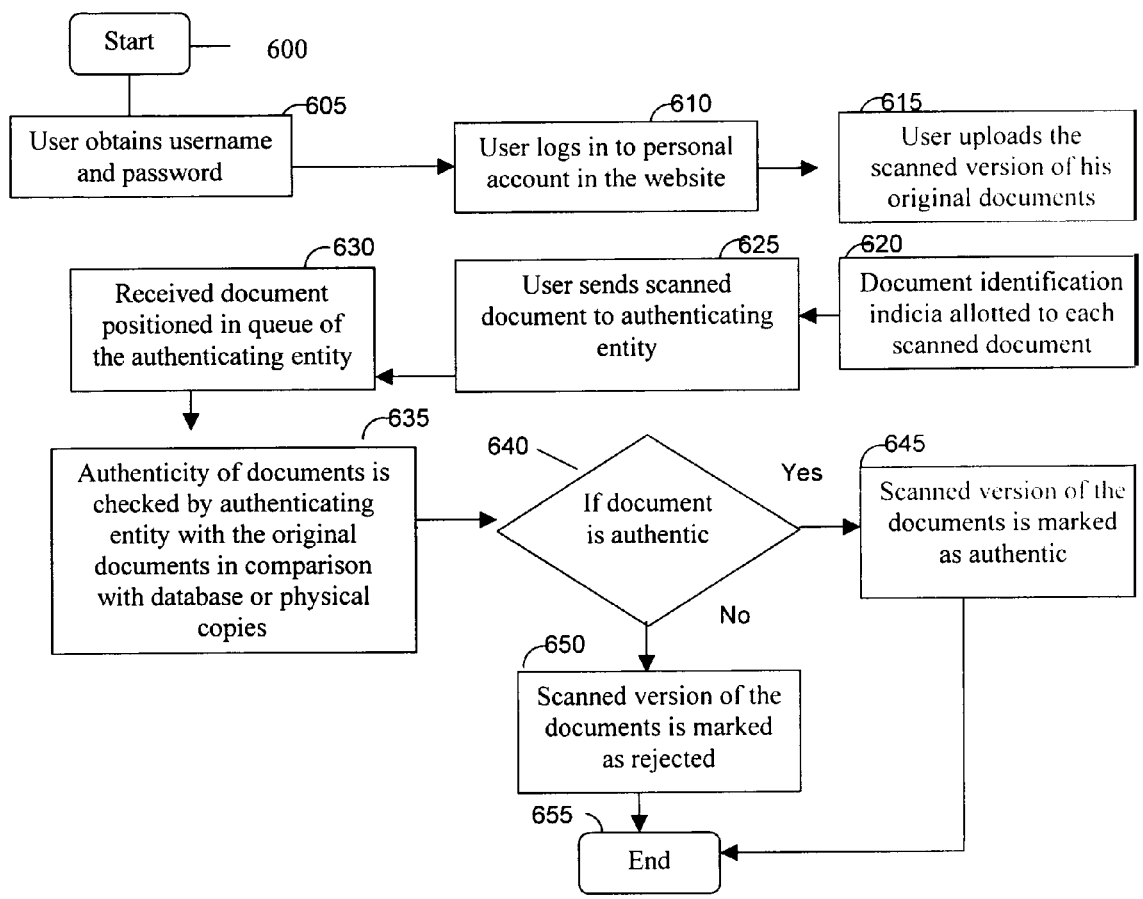

FIG. 6 explains the scenario of authentication from the point of view of the end user in accordance with an embodiment of the invention.

FIG. 7 explains the authentication procedure from the point of view of the institution.

DETAILED DESCRIPTION

It is common practice for people to migrate for the purposes of employment, education and the like. The institution in the country or state, in which authentication of documents is sought, performs a check to confirm the authenticity of copies of the documents provided for the purpose of entry. In order to perform the check, it is necessary that a third party attest the copies of the related documents.

The third party is conventionally an agency, which has been authorized beforehand, to perform the task of authentication. Even though the third party has been described as an independent institution, the third party may be in an embodiment of the invention, the institution in which the educational qualification has been completed. In another embodiment, the third party may be a notary.

Prior to the advent of the communication networks, such as the Internet, the procedure for attesting a document for the purpose of authentication is performed manually. Such a scenario in which, the procedure for attesting a document is performed manually, is depicted in conjunction with FIG. 1.

Figure 1:
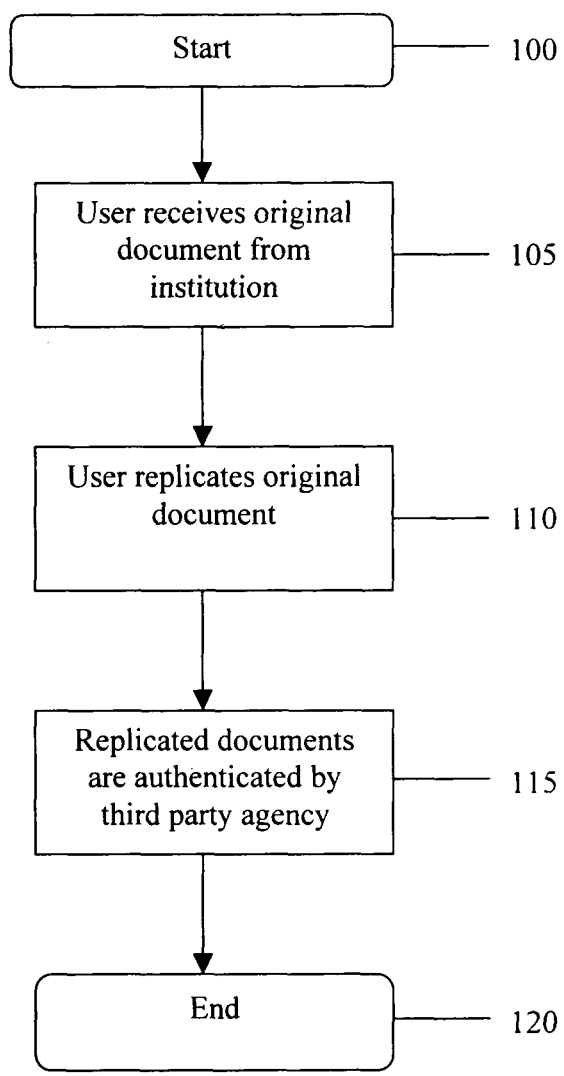
FIG. 1 illustrates a method of authentication of a document embodied in a flow chart, in accordance with conventional practice.

FIG. 1 illustrates a method of authentication of a document embodied in a flow chart, in accordance with conventional practice.

At step 105, a user receives original documents from the educational institution or the like pertaining to, for example, the completion of an educational qualification. Although the example has been stated to be pertaining to the educational qualification, it is to be noted that the invention encompasses within its scope, any documents that are required to be authenticated and the mention of educational qualification is for purposes of illustration only.

Further, even though the example of documents has been described within the disclosure, the scope of the invention is not restricted to documents only and extends to any application of similar functionality.

At step 110, the user replicates the original documents by means of replication, available in the art. In the disclosure, in an embodiment, the mode of replication is photocopying of the original documents. It is to be noted that, even though photocopying has been mentioned in the disclosure, it is for the purpose of illustration only.

At step 115, the photocopied documents are authenticated by a third party agency. The third party agency authenticates the photocopies of the original documents on comparison with the original documents. After verification of the documents, on comparison with the original documents, the third party agency attests the documents with a seal and/or signature. After the attestation process is completed, the attested documents are submitted to the education or employment related institution. The process and steps of submission to the institution related to education or employment and the subsequent are described herein in conjunction with FIG. 2.

Figure 2:
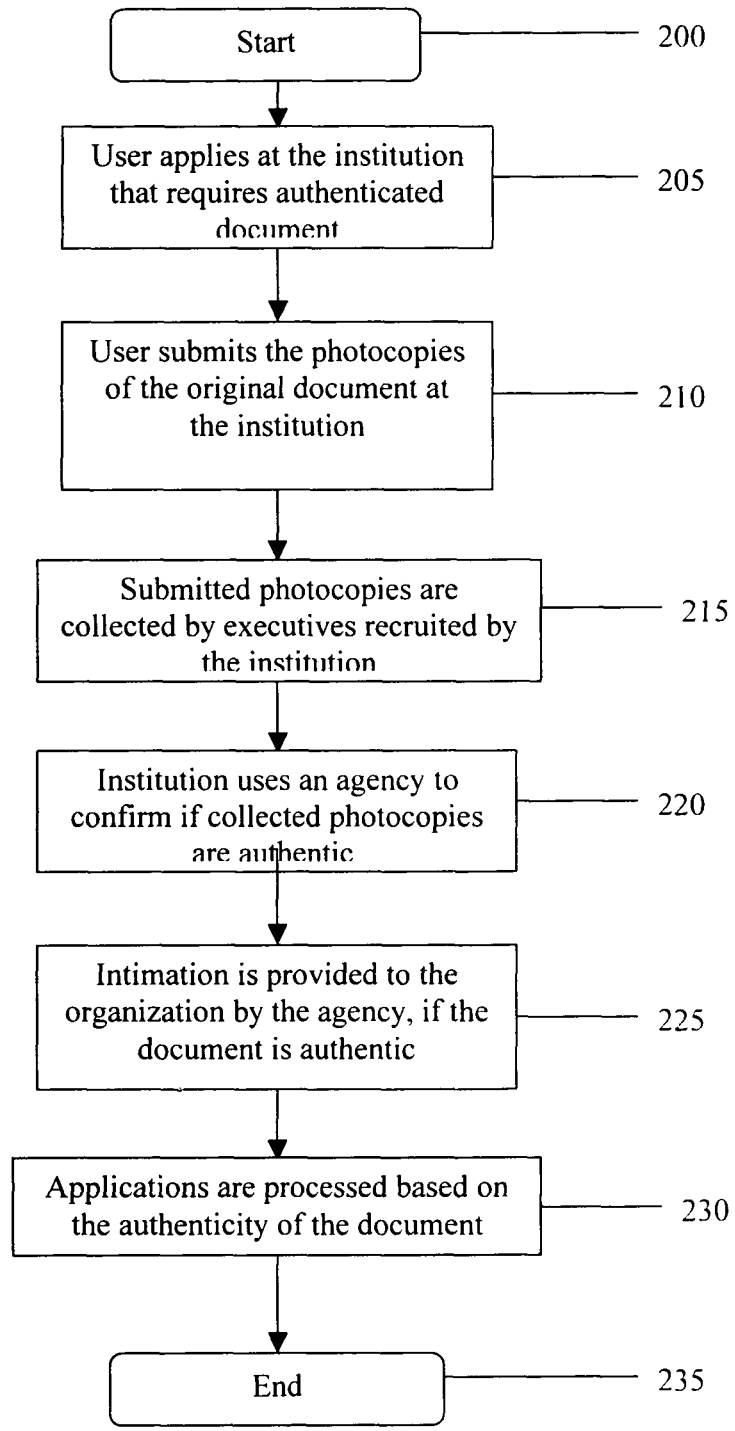
FIG. 2 illustrates an application of the authentication of a document embodied in a flow chart, in accordance with conventional practice.

FIG. 2 illustrates an application of the authentication of a document embodied in a flow chart, in accordance with conventional practice.

At step 205, initially, the user applies for admission at the institution for the purpose of education or employment at an institution. Although the disclosure states the scenario of education or employment, the disclosure is not restricted to the scenario of employment or educational institutions only, and is extended to any application of similar functionality.

At step 210, user submits the photocopies of the original document at the institution relating to education or employment. The photocopy is attested by method as described in conjunction with FIG. 1.

At step 215, the submitted photocopies are collected by executives recruited by the institution in which education or employment is sought. The step of recruiting executives is an optional step and may be adopted in accordance with the requirement of the institution.

At step 220, the institution uses an agency to confirm if the collected photocopies are authentic. The agency may be a third party or a part of the institution in which education or employment is sought.

At step 225, an intimation is provided to the organization by the agency, if the document is authentic. Based on the authenticity of the document, the application is processed at step 230. The procedure followed is cumbersome and time consuming, since the steps involved are carried out manually.

With the advent of communication networks, like the Internet, it is not necessary to deploy manual methods. The procedure of authentication and admission into an educational or employment is capable of being performed electronically and in a simple and less time consuming manner. This is explained further, in conjunction with subsequent figures and related explanations. The basic components of such a system are illustrated in FIG. 3.

Figure 3:
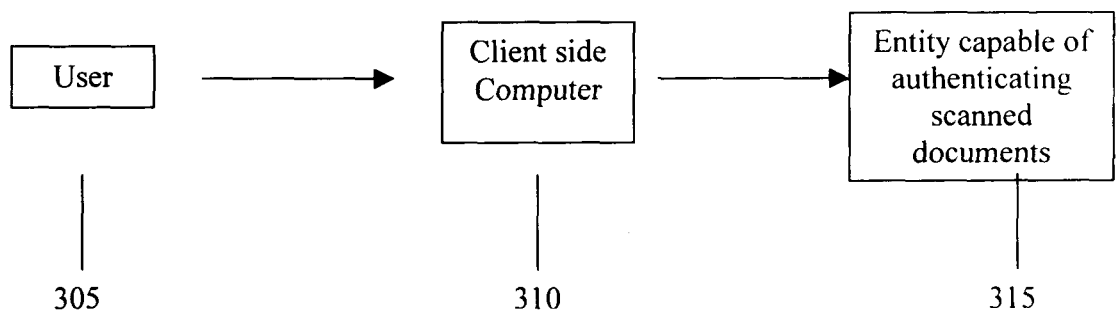
FIG. 3 illustrates the overview of the working of the system of authentication of a document embodied in a block diagram, in accordance with an embodiment of the invention.

FIG. 3 illustrates the overview of the working of the system of authentication of a document embodied in a block diagram, in accordance with an embodiment of the invention.

The method as embodied in the invention involves, initially, creation of a website, subject to the control of an administration entity. On creation of the website, a user 305 requiring the attestation of documents to be performed, accesses the website through a username and password. The creation of username and password is further explained in FIG. 4. When the user requires documents to be attested, the user accesses the website at the client side computer 310 using his user name and password and sends the scanned document to the entity, which is capable of authenticating the scanned documents. The document is positioned in the queue of the entity.

It will be apparent to a person skilled in the art that even though the sending and receiving the scanned documents is described in a simple manner, all the modes of security which are generally applied to transactions involving sending and receiving of sensitive data are applied. For the purposes of illustration only, the modes of security could be encryption of data, usage of SSL. It would be apparent to a person skilled in the art that the modes of security as mentioned in the disclosure are for the purposes of illustration only and would not restrict the scope of the present disclosure.

The entity 315, which is capable of authenticating the scanned documents accesses the scanned documents using the username and corresponding password. The creation of the username and password for entity 315, is further explained in FIG. 5 and FIG. 6, based on the received document identification indicia by which each document is uniquely identifiable and checks the authenticity of documents with the original document. If the document is authentic, the scanned version of the documents is marked as authentic, after verification with the original document. The procedure of the confirmation of authentication is performed at the institution, for example, in which the education or employment is sought. This procedure is explained in detail in conjunction with FIG. 7.

Figure 4:
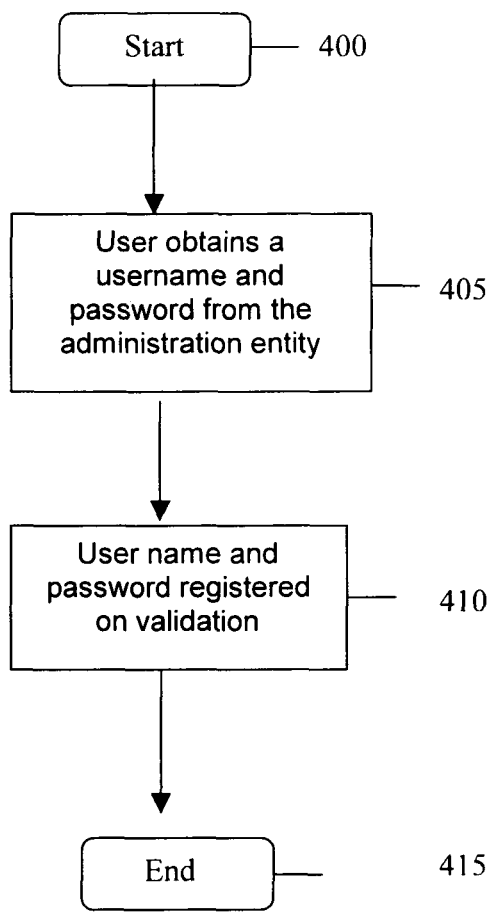
FIG. 4 illustrates the method of user name creation embodied in a flow diagram for the end user whose documents are to be attested, in accordance with an embodiment of the invention.

FIG. 4 illustrates the method of user name creation embodied in a flow diagram for the end user whose documents are to be attested, in accordance with an embodiment of the invention.

On creation of the website, a user requiring the attestation of documents to be performed, accesses the website. Thereafter, at step 405, the user obtains a username and password from the administration entity, subject to the validation of the user by the administration entity.

If the administration entity validates the user, the user name and password is registered at step 410. Further, the username and password is employable for privately accessing the website and storing documents at the website at a location specifically allotted to the user.

Similar to the procedure of user name and password creation for a user requiring the attestation of documents, the entity which is capable of authenticating the scanned documents and the institution which requires confirmation of authentication of documents are also provided with user name and password subject to the validation of the administration entity. This procedure is further described in conjunction with FIG. 5.

Figure 5:
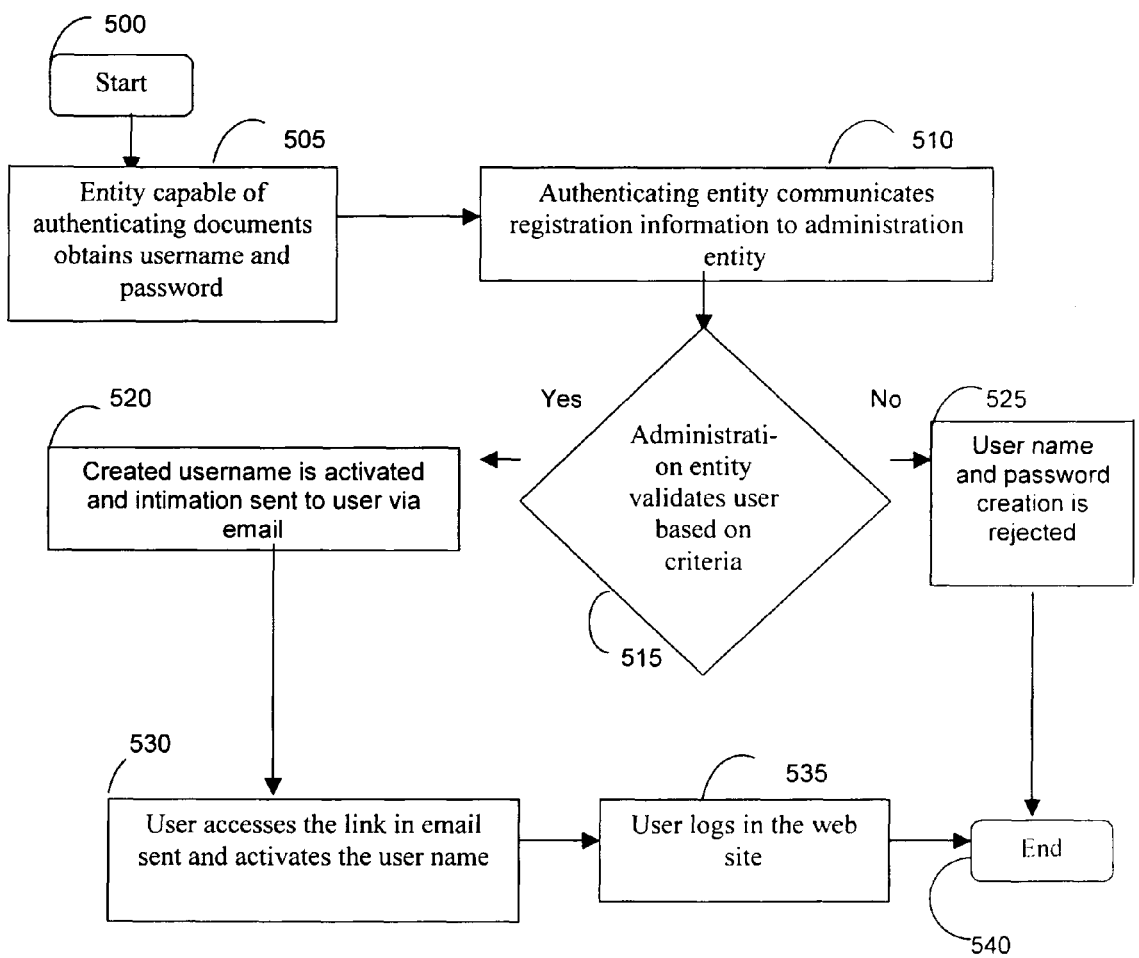
FIG. 5 illustrates the method of user name creation embodied in a flow diagram, for the entity, which is capable of authenticating the scanned documents and the institution having requirement for confirmation of the authenticity of documents, in accordance with an embodiment of the invention.

FIG. 5 illustrates the method of user name creation embodied in a flow diagram, for the entity, which is capable of authenticating the scanned documents and the institution having requirement for confirmation of the authenticity of documents, in accordance with an embodiment of the invention. Using the website, the user uploads the scanned version of his original documents at the allotted location by using the obtained user name and created password as observed in explanation of FIG. 4.

An entity which is capable of authenticating the scanned documents accesses the website and obtains a username and password, after registering in the website at step 505 and communicates the registration information to the administration entity at step 510. The administration entity applies predefined criteria in determining validation of the user and makes a decision at step 515.

If the administration entity validates the user, the created username is activated. The intimation pertaining to the activation of the user name is sent to the user by methods of communication known in the art, at step 520. In an embodiment, the method of communication may be via email.

The user accesses the link sent via the email and activates the user name at step 530. Subsequent to the activation of the user name, the user logs in the website at step 535. However, if the user name is not validated, the user name and password creation is rejected at step 525.

Similarly, an institution which is being approached for education or employment accesses the website and obtains a user name and password after registering in the website subject to the validation of the user by the administration entity. The procedure adopted for registration of an institution is similar to that of an entity, which is capable of authenticating the scanned documents. Subsequent to the creation of user name and password, the procedure of authentication by electronic means can be initiated. This is further explained in FIG. 6.

FIG. 6 explains the scenario of authentication from the point of view of the end user in accordance with an embodiment of the invention. The scenario of authentication from the point of view of the institution having requirement for confirmation of the authenticity of documents, in accordance with an embodiment of the invention can be further explained in FIG. 7.

In accordance with FIG. 6, the method as embodied in the invention involves, initially, creation of a website, subject to the control of an administration entity. On creation of the website, a user requiring the attestation of documents to be performed, accesses the website at step 605.

Thereafter, a user obtains a username and password from the administration entity subject to the validation of the user by the administration entity. The username and password is employable for privately accessing the website and storing documents at the website at a location specifically allotted to the user. By employing the user name and password, the user logs into his personal account in the website at step 610.

Using the website, the user uploads the scanned version of his original documents at the allotted location in his personal account at step 615. On upload of the scanned documents, a document identification indicia by which each document is uniquely identifiable, is allotted to each one of the scanned documents at step 620. Even though the document identification indicia is uniquely allotted, it is possible to allot the document identification indicia to a collection of documents.

When the user requires documents to be attested, user accesses the website using his user name and password and sends the scanned document to the entity which is capable of authenticating the scanned documents at step 625. The received document is positioned in the queue of the entity at step 630.

The entity which is capable of authenticating the scanned documents accesses the scanned document. The authenticity of documents is checked with the original documents at step 635. The decision of whether the document is authentic is made at step 640. If the document is authentic, the scanned version of the documents is marked as authentic, after verification with the original document at step 645. If the document is not authentic, the scanned version of the documents is marked as rejected, after verification with the original document at step 650.

If the document is authentic as illustrated in the explanation of the FIG. 6, the scanned version of the documents is marked as authentic, after verification with the original document at step 645. It is to be noted that the attestation is to be performed only once and the records are permanent and accessible online. Also, irrespective of the date of issue of the document, the document may be attested and the record may also be maintained permanently.

In such a scenario, when the user requires an entry into an educational or employment institution, the institution may require to determine the authenticity of the document. The authentication procedure from the point of view of the institution is described in FIG. 7.

In FIG. 7, the institution obtains the document identification indicia by which each document is uniquely identifiable at step 705 with the prior approval of the user. It is to be noted that the time frame for validity of approval of the user is time bound. In an embodiment, the approval may be valid for a day.

If the user approves, at step 715, the institution logs in the website and accesses the associated document using the document identification indicia by which each document is uniquely identifiable. After identifying the document, the institution downloads the document and checks the attestation details. The administration entity determines the documents accessed by institution. Based on the result of the administration entity, an automated bill is prepared with a predefined time interval and sent to the institution, which requires to determine the authenticity of the document at step 735.

Examples of documents that are attestable via the mode of authentication of the present invention are inclusive of but not restricted to, educational and employment related documents. In embodiments, the documents that are attestable are government or official documents. In an exemplary embodiment a passport can be authenticated through the mode of authentication of the present invention.

From the figures in conjunction with the explanation, the advantage that can be readily inferred is, the present invention eliminates the necessity to retain a photocopy of an essential document.

As a unique document identification indicia is allotted to each document, the user needs to provide only the unique document identification indicia and approval for access to the institution in case of reporting even loss or tampering of the document. The disclosure reveals a unique document identification indicia being allotted to each document. However, the unique document related indicia may be allotted to a collection of documents.

The method as embodied in the invention involves, initially, creation of a location such as a website, subject to the control of an administration entity. On creation of the website, a user requiring the attestation of documents to be performed, accesses the website. Thereafter, the user obtains a username and password from the administration entity subject to the validation of the user by the administration entity. The username and password is employable for privately accessing the website and storing documents at the website at a location specifically allotted by the administration entity to the user.

Using the website, the user uploads the scanned version of his original documents at the allotted location by using the obtained user name and created password. On upload of the scanned documents, a document identification indicia by which each document is uniquely identifiable, is allotted to each one of the scanned documents.

Similarly, an entity which is capable of authenticating the scanned documents accesses the website and obtains a username and password after registering in the website subject to the validation of the user by the administration entity. The created username is activated.

Similarly, an institution which is being approached for education or employment accesses the website and obtains a user name and password after registering in the website, subject to the validation of the user by the administration entity. The created user name is activated.

When the user requires documents to be attested, user accesses the website using his user name and password and sends the scanned document to the entity which is capable of authenticating the scanned documents. The received document is positioned in the queue.

The entity, which is capable of authenticating the scanned documents accesses, the scanned documents checks the authenticity of documents by comparison with the original documents available in the database of the entity, which is capable of authenticating the scanned documents. If the document is authentic, the scanned version of the documents is marked as authentic, after verification with the original document, available in the database of the entity, which is capable of authenticating the scanned documents. It is to be noted, that the authentication is performed only once and the record is permanent and accessible online.

When an institution requires to determine the authenticity of the document, the institution obtains the document-identification indicia by which each document is uniquely identifiable with the prior approval of the user whose scanned documents are to be verified. The institution logs in the website and accesses the associated document using the document identification indicia by which each document is uniquely identifiable. As a result, online sharing of the document is enabled.

After identifying the document, the institution downloads the document and checks the attestation details. The administration entity determines the documents accessed by institution. Based on the result of the administration entity, an automated bill is prepared on a predefined time interval and sent to the institution, which requires to determine the authenticity of the document.

It is to be noted that the attestation for a particular document is required to be performed only once, the record being permanent and the subsequent online access being enabled.

Also, the attestation and subsequent online sharing is performed through an electronically simple mechanism in which, irrespective of the date of issue of the document, the document may be attested and the record may also be maintained permanently.

Even though the advantages of the present invention are numerous, the advantages enumerated are enclosed in an illustrative manner. It would be apparent to a person skilled in the art that the advantages of the present invention are not restricted to the enumerated advantages and would encompass any advantage arising out of the enumerated advantages.

The invention requires scanning, uploading and attestation only once. Application for international services become easier on savings of courier cost and postage time. The unique documentation indicia alone is provided to the institution. Based on the unique documentation indicia, a request is sent by the institution.

The copies of documents can be attested as "verified with original". The present invention allows low cost of verification. The attestation can be done by the organization issuing the certificate. All the entity needs to have is dedicated resource for attesting the documents based on the organization database. There is no major capital cost associated with the new system for verifying documents with originals.

There is a reduction in time for the institution to access the documents. The unique documentation indicia is entered for document request and the customer approves the request on the net. The process consumes less time. The invention allows instant access to the documents.

Chances of fraud are reduced along with reduction in time for submission of applications. The present invention does not use paper for application and attestation. The copies are directly accessed by the institution using the unique document indicia and attestation of the document by the verifier is performed. Conventional methods of forging original and their copies cannot be performed. There are no chances of document loss in transit. Currently, most application are made by submitting physical copies of the document. Copies of the document are sent by post, courier and other physical method. The present invention eliminates the need for copies to the sent physically. The Institute requiring the document can key in the unique document indicia and retrieve the document once user approves the request.

Document can be accessed by the institution in very little time. The attestation cannot be forged, unless hacking is involved. The present invention uses a digital signature which is done by user name and password, which has been locked to a particular PC. The conventional method of forging attested copies cannot be done.

Complete paper-less attestation and application are integrated onto one site: The new system not only allows attestation of a document, but also allows an applicant to apply for services that require documents. Based on the unique document indicia, the institution can have access to a document, and at the same time, ensure that the document is original and not been forged.

The process of checking for fraudulent documents is terminated, if the document is attested by the issuing institution. Currently, if the documents has been submitted a copy, a separate agency is given responsibility to establish the authenticity of the documents. The methods used by the agencies involves among others, field visits etc. The physical copies are taken to the issuing organization and verified with the originals. This happens as many numbers of times as the user applies for a service or product requiring document to the issuing organization for verification. The requirement for an independent agency for certifying the document is eliminated.

Time is reduced for the institution to obtain documents: The process of sending couriers for application is highly time consuming. Under the present invention, the institution can have instant access to documents online once approved by the user.

The institution can save on storage space as there is no physical space utilized for document storage. The document is stored in soft copy, and hence there is considerable space saving by the institution.

While some institutions do not require the copy of the documents to be attested, certain applications require mandatory attestation of the document copies with original. Under the KYC (Know Your Customer) system by financial institutions, document accompanying the applications must be certified as "verified in original". This present system eliminates attestation requirements each time an application is made as attestation is just done once and valid through out.

I claim:

1. An electronically implemented method for authentication and sharing of a document via a communication network, comprising the steps of:
 (i) uploading a scanned version of an original document at an allotted location accessible using the communication network, the allotted location being a specific location on a website of an administrative entity related to a user account;
 (ii) allotting a unique document identification indicia to the uploaded original document by which the uploaded original document is uniquely identifiable to an administration entity;
 (iii) communicating the uploaded and the scanned version of the original document to an authenticating entity, which is capable of authentication of the scanned document, the authenticating entity being an entity that issued the original document;
 (iv) verifying the scanned version of the original document, the verification including comparison of the scanned version with the original document available with the authenticating entity either in its database or as a physical copy;
 (v) authenticating the verified document, and
 (vi) sharing the authenticated document via the communication network.

2. The electronically implemented method for authentication and sharing of a document via a communication network as claimed in claim 1, wherein the communication network is the internet or a mobile communication network.

3. The electronically implemented method for authentication and sharing of a document via a communication network as claimed in claim 1, wherein the document identification indicia is alphabetic, numeric or alpha-numeric.

4. The electronically implemented method for authentication and sharing of a document via a communication network as claimed in claim 1, wherein a method for sharing of the uploaded document comprises the steps of citing the document identification indicia details to a third party, and enabling sharing with the third party by inputting said cited indicia through the communication network.

5. The electronically implemented method for authentication and sharing of a document via a communication network as claimed in claim 1, wherein the document comprises a certificate, license, registered document, copy of policy, share document, or a letter patent.

6. The electronically implemented method for authentication and sharing of a document via a communication network as claimed in claim 1, wherein the authentication by the authenticating entity is required only once.

7. The electronically implemented method for authentication and sharing of a document via a communication network as claimed in claim 1, where the authentication is performed irrespective of the date of issue of the document.

8. The electronically implemented method for authentication and sharing of a document via a communication network as claimed in claim 1, wherein the administrative entity is a service provider having a database for sharing the authenticated document using the communication network.

9. An electronically implemented system for authentication and sharing of a document via a communication network, wherein the system comprises:
 (i) a client-side computer employed by a user to input a scanned version of an original document at an allotted location accessible using a communication network, said allotted location being a specific location in a website of an administration entity related to a user account;
 (ii) an authenticating entity, which is capable of verifying and authenticating the scanned version of the document by comparing the scanned version of the document with the original document available with an authenticating entity either in a database or as a physical copy, the authenticating entity being the entity that issued the original document; and
 (iii) a third party with whom the authenticated and electronically attested document is shared using the communication network.

* * * * *